(No Model.)
E. A. OVENSHIRE.
HARROW TOOTH FASTENER.
No. 514,836. Patented Feb. 13, 1894.
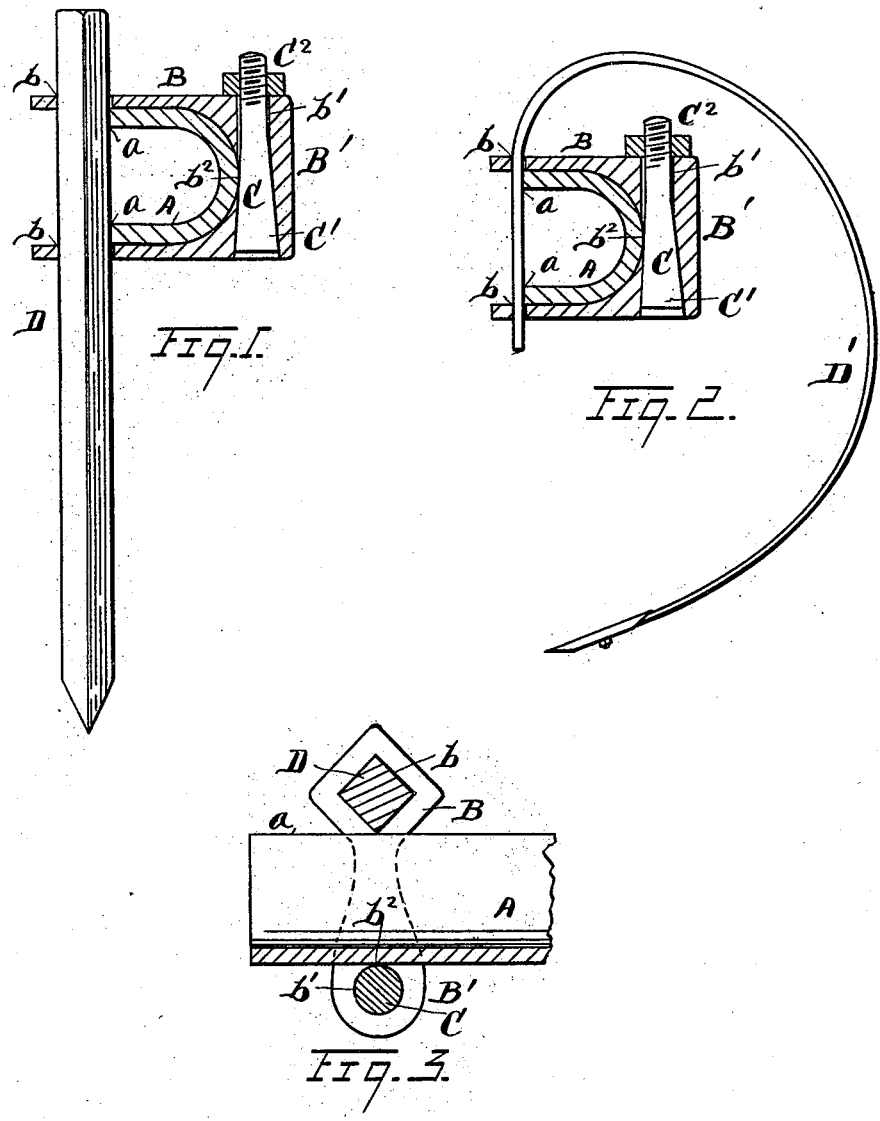
Witnesses
John Schuman
John F. Miller
Inventor
Elijah A. Ovenshire
By his Attorney
Newell S. Wright

UNITED STATES PATENT OFFICE.

ELIJAH A. OVENSHIRE, OF DETROIT, MICHIGAN.

HARROW-TOOTH FASTENER.

SPECIFICATION forming part of Letters Patent No. 514,836, dated February 13, 1894.

Application filed December 31, 1892. Renewed January 17, 1894. Serial No. 497,200. (No model.)

*To all whom it may concern:*

Be it known that I, ELIJAH A. OVENSHIRE, a citizen of the United States, residing at Detroit, county of Wayne, State of Michigan, have invented a certain new and useful Improvement in Harrow-Tooth Fasteners; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a harrow tooth fastener, having for its object an attaching device of superior simplicity, economy and utility.

My invention consists of the combination, construction and arrangement of devices and appliances hereinafter specified and claimed, and illustrated in the accompanying drawings, in which—

Figure 1 is a vertical section embodying my invention as applied to a square tooth. Fig. 2 is a similar view, showing its application to a spring tooth. Fig. 3 is a horizontal section.

The desirability of a simple, economical device for attaching a harrow tooth to the bar of the harrow, which may be readily applied, and which will be firm and durable, is well understood.

I carry out my invention as follows:

In the drawings A represents a bar of the harrow or cultivator, which may be of any desired form. As shown, it consists of a U-shaped metallic bar of ordinary construction.

B is a clip, constructed to be engaged upon the bar, the clip at its extremities projecting over or beyond the edges "$a$" of the bar, and slotted as at "$b$," to receive the harrow tooth of any desired form. The clip is constructed to form a loop or eye B', at its intermediate portion, said loop being constructed with a longitudinal orifice "$b'$," the orifice communicating through the loop on the side adjacent to the bar, as shown at "$b^2$." The longitudinal orifice is made tapering from one end toward the other as shown.

C is a bolt constructed to be inserted in the longitudinal orifice of the clip, said bolt formed with a tapering head, as shown at C'. C² is a nut having a screw threaded engagement with the end of said bolt. It will be observed that the tapering head of the bolt when in place, forms a wedging contact with the bar A, the tapering orifice in the clip allowing it to be drawn up by the nut, and thus to tighten the clip with great firmness upon the bar. In so doing the harrow tooth is caused to bind rigidly against the edges "$a$" of the bar, and the tooth is thus held in place. Any desired tension may be readily effected by screwing the nut up upon the bolt, wedging more firmly the bolt against the adjacent portion of the bar.

D represents a square tooth. Where such a tooth is used, the clip will be correspondingly slotted as at "$b$."

D' is a spring tooth. Where such a tooth is employed, the clip will be constructed with corresponding elongated orifices as at "$b$."

Such a device evidently provides a very economical and ready means for attaching the harrow tooth upon the bar.

What I claim as my invention is—

1. The combination with the bar of a harrow or cultivator, of a clip embracing the bar and slotted to receive the harrow tooth to bear against the said bar, said clip constructed intermediate its ends with an eye formed with a longitudinal orifice communicating through the eye adjacent to said bar, a bolt inserted in said orifice forming contact with the bar, and a nut to tighten said bolt upon the bar, substantially as set forth.

2. The combination with the bar of a harrow or cultivator, of a clip embracing the bar, a tooth engaged in the extremities of said clip and bearing against the bar, said clip constructed intermediate its ends with an eye formed with a tapering longitudinal orifice, communicating through the eye adjacent to the bar, a bolt constructed with a tapering head engaged in said orifice, and a nut to tighten said bolt upon the bar, substantially as set forth.

In testimony whereof I sign this specification in the presence of two witnesses.

ELIJAH A. OVENSHIRE.

Witnesses:
N. S. WRIGHT,
J. F. MILLER.